E. S. SMITH.
BOX OR CAN HOOK.
APPLICATION FILED MAR. 30, 1917.

1,243,565.

Patented Oct. 16, 1917.

WITNESSES

INVENTOR
E. Scott Smith.
BY
ATTORNEY

UNITED STATES PATENT OFFICE.

EDWARD SCOTT SMITH, OF SELMA, CALIFORNIA.

BOX OR CAN HOOK.

1,243,565.   Specification of Letters Patent.   Patented Oct. 16, 1917.

Application filed March 30, 1917. Serial No. 158,661.

*To all whom it may concern:*

Be it known that I, EDWARD SCOTT SMITH, a citizen of the United States, residing at Selma, in the county of Fresno and State of California, have invented new and useful Improvements in Box or Can Hooks, of which the following is a specification.

The present invention relates to an implement designed to facilitate the handling of boxes, cans and other containers, and the primary object of the invention is to produce an article of this character which shall be of a simple construction and which may be readily applied to the article to be handled so that the same may be effectively grasped and conveyed by the operator.

With the above and other objects in view the improvement resides in the construction, combination and arrangement of parts set forth in the following specification and falling within the scope of the appended claims.

Figure 1:
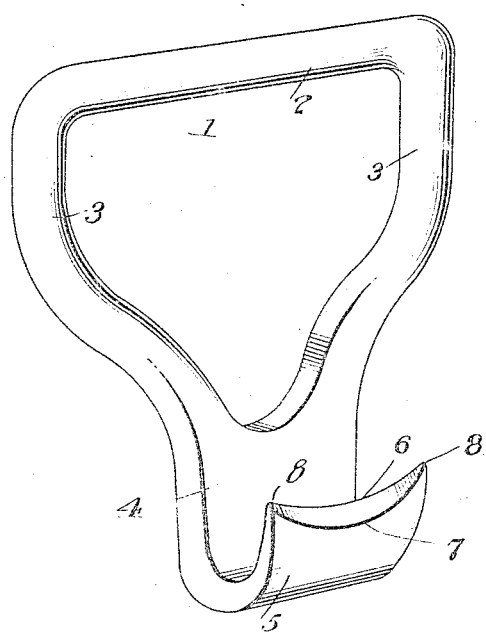
Figure 1 is a perspective view of the improvement.
Figure 2:
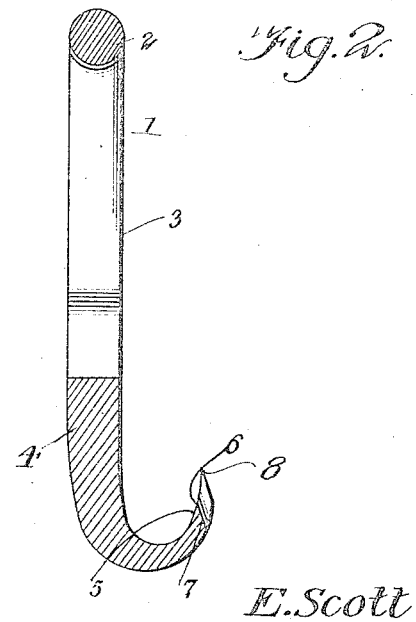
Fig. 2 is a central longitudinal sectional view through the same.

The improvement is in the nature of a grab and is adapted for use upon boxes, cans or other containers, whereby the hook of the improvement will engage with a bead or projection upon the box or can, or whereby the sharpened end of the hook may be forced to enter the said box or can or still again whereby the hook may be arranged within the handle which may be provided upon the said box or can and which does not project above the top of the said box or can, whereby to provide a handle for the said box or can to facilitate the handling thereof.

The improvement is constructed from a single element and is shaped to provide a handle portion or bail 1, the same preferably having the outer bail 2 thereof round in cross section and the side members 3 integrally formed at the ends of the said member 2 rounded inwardly to provide a flat or straight shank 4. The shank comprises a comparatively wide element and at the outer end thereof is rounded upon itself and continued in a line with but spaced from the shank proper to provide the hook 5. This hook 5 is sharpened, as indicated by the numeral 6, whereby the same may be caused to bite within the article to which the device is applied, and preferably the sharpened edge 6 of the hook is concaved from one of the ends thereof to the other as indicated by the numeral 7, whereby the same will conform to the contour of the rounded container or whereby the ends, indicated for distinction by the numeral 8, will provide entering prongs which may be readily inserted in the surface of a flat or straight container.

It is, of course, to be understood that the handle portion of the device is arranged above the top of the container when the sharpened edge of the hook is inserted in the side of the container or is brought to engage beneath a bead or other projection upon the side of the container, and as a consequence the improvement greatly facilitates in the handling of containers.

Having thus described the invention, what I claim is:

1. A device of the class described constructed of a single element shaped to provide a bail-shaped handle, the side members of which converge toward each other and terminate in a comparatively wide substantially rectangular shank, said shank at the outer edge thereof being rounded upon itself to provide a hook, said hook having its outer edge sharpened and being concaved from the opposite ends to the center thereof whereby to provide the said ends of the hook with entering prongs.

2. An article of the class described constructed in a single piece shaped to provide a handle, a shank connected with the handle and a rounded hook member connected with the shank, said hook gradually increasing in thickness from its beak to its connection with the shank, and said beak being centrally concaved, whereby to provide the opposite corners of the hook with substantially V shaped prongs.

In testimony whereof I affix my signature.

EDWARD SCOTT SMITH.